United States Patent
Sangili et al.

(10) Patent No.: US 8,214,834 B2
(45) Date of Patent: Jul. 3, 2012

(54) ASYNCHRONOUS WAKEUP MECHANISM THAT PLACES REFERENCE TO PROCESS ON SLEEP QUEUE IF EXECUTION OF COPYOUT FUNCTIONALITY IS CAUSED TO SLEEP

(75) Inventors: Vasudevan Sangili, San Jose, CA (US); Chukwuma Valentine Akpuokwe, Sunnyvale, CA (US); Swapneel Kekre, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1464 days.

(21) Appl. No.: 11/742,555

(22) Filed: Apr. 30, 2007

(65) Prior Publication Data

US 2008/0270812 A1  Oct. 30, 2008

(51) Int. Cl.
*G06F 9/46* (2006.01)
(52) U.S. Cl. ........................................ 718/102
(58) Field of Classification Search ............... 718/102
See application file for complete search history.

(56) References Cited

U.S. PATENT DOCUMENTS

| 5,057,996 | A | * | 10/1991 | Cutler et al. | 718/106 |
| 5,873,124 | A | * | 2/1999 | Draves | 711/202 |
| 2004/0060049 | A1 | * | 3/2004 | Mendoza et al. | 718/100 |

OTHER PUBLICATIONS

Hewlett-Packard Company, "HP-UX Process Management", White Paper, Version 1.3, Apr. 27, 1997.*

* cited by examiner

*Primary Examiner* — Meng An
*Assistant Examiner* — Brian Chew

(57) ABSTRACT

A system for asynchronous process sleep or wake management and corresponding methods thereof are described. The system comprises a sleep queue hash table, a process, and a first sleep object and a second sleep object. The first and second sleep objects each comprise a sleep queue and each of the first and second sleep objects are associated with the process. The system further comprises one or more kernel-space processes arranged to perform at least one of associating the first sleep object with the sleep queue hash table and designating the second sleep object to be used for sleeping the process.

24 Claims, 3 Drawing Sheets

ASYNCHRONOUS WAKEUP MECHANISM THAT PLACES REFERENCE TO PROCESS ON SLEEP QUEUE IF EXECUTION OF COPYOUT FUNCTIONALITY IS CAUSED TO SLEEP

BACKGROUND

The ksleep( ) system call provides the capability that user space locks can be released after placing a thread in a kernel sleep queue. Synchronization of releasing the user space locks is needed in order for user space libraries to avoid missing wakeup signals. Because the lock is held in user space, a copyout( ) system call is used to release the lock from kernel space.

DESCRIPTION OF THE DRAWINGS

One or more embodiments is illustrated by way of example, and not by limitation, in the figures of the accompanying drawings, wherein elements having the same reference numeral designations represent like elements throughout and wherein.

DETAILED DESCRIPTION

Figure 1:
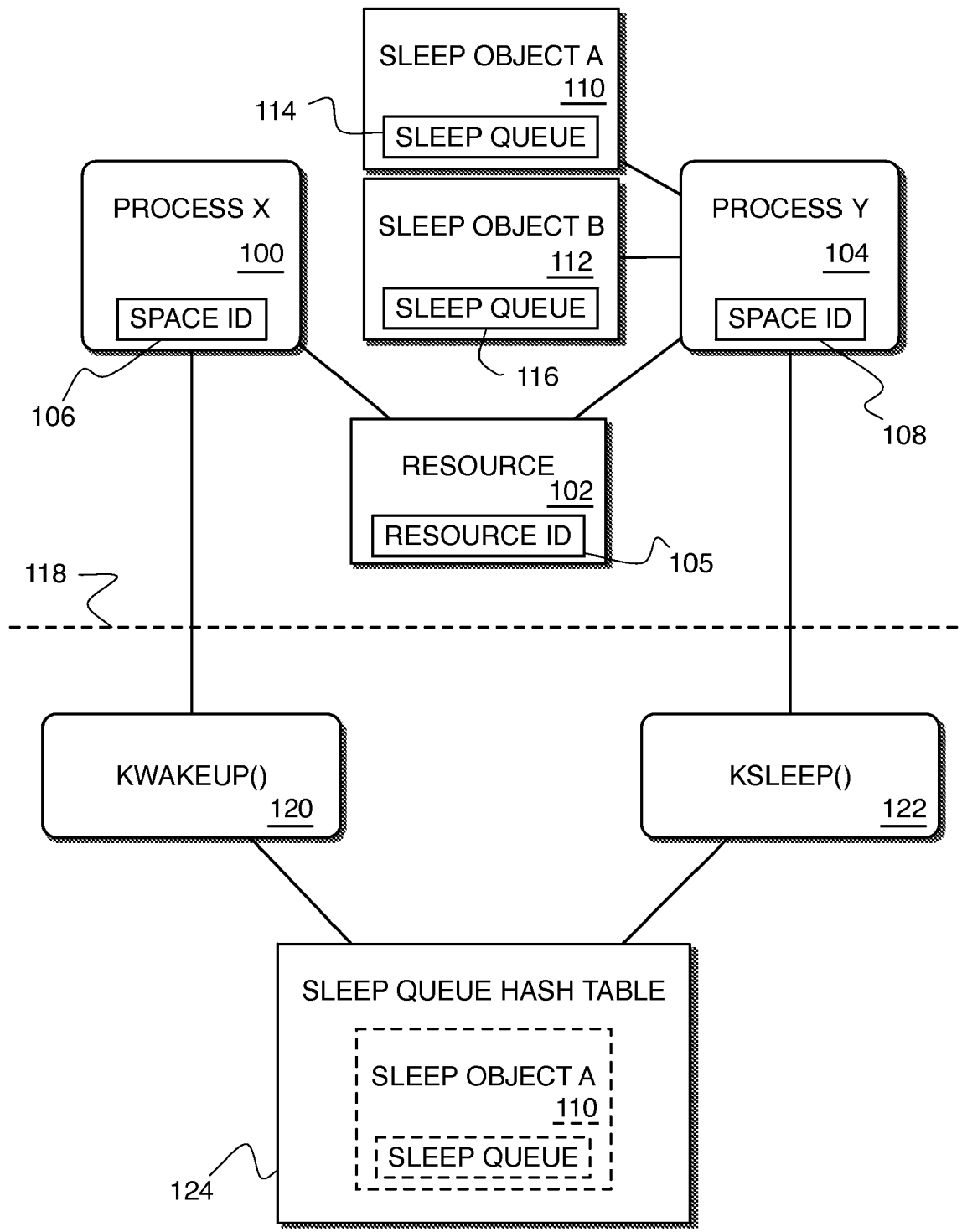
FIG. 1 is a high-level functional block diagram according to an embodiment.

FIG. 1 depicts a high-level functional block diagram of an embodiment in which a first process X 100, i.e., a process comprises a set of executable instructions executed by a processor, accesses a resource 102 to the exclusion of a second process Y 104, e.g., process X retains a lock on the resource preventing other processes from accessing the resource. Resource 102 may comprise a variable, a portion of an executable instruction set, a semaphore, or similar mechanism. Resource 102 further comprises a resource identifier (ID) 105 uniquely identifying the resource.

Process Y 104 attempts to access resource 102 while process X 100 retains exclusive access to the resource, e.g., process Y attempts to obtain a lock on the resource. During the time period in which process Y 104 waits to access resource 102, process Y is said to be in a "spinning" or waiting state.

Each of processes X and Y further comprise a respective space identifier (ID) 106, 108 which uniquely identifies the resources of the corresponding process.

Process Y 104 is associated with a sleep object A 110 and a sleep object B 112. In at least some embodiments, sleep objects A and B 110, 112 are created at the time of execution of process Y 104. In at least some embodiments, sleep objects A and B 110, 112 are created at the time of instantiation of process Y 104. In at least some embodiments, process X 100 may be associated with sleep objects A and B 110, 112.

Sleep objects A and B 110, 112 each further comprise a respective sleep queue 114, 116 for storing a reference to a sleeping process, e.g., process Y 104. In at least some embodiments, sleep objects A and B 110, 112 store space ID 106 and/or space ID 108.

Dashed line 118 indicates a separation between user-space processes, processes which execute at a user level of privilege, positioned above the line 118 and kernel-space processes, e.g., processes which operate at an elevated level such as an operating system level of privilege, positioned below the line. As depicted, processes X and Y 100, 104 are user-space processes. In at least some embodiments, resource 102 may be located in user-space or kernel-space.

Further, as depicted in FIG. 1, kernel-space comprises a wakeup process 120 ("KWAKEUP( )") and a sleep process 122 which are each accessible, e.g., callable, by other kernel-space processes and by user-space processes, e.g., processes X and Y 100, 104. Wakeup process 120 comprises a set of executable instructions executed by a processor to perform the operations to wake a sleeping process, i.e., a process which is not currently executing. Conversely, sleep process 122 comprises a set of executable instructions for execution by a processor to perform operations to cause an executing process to sleep, e.g., process Y 104 may be caused to sleep while spinning for access to resource 102.

Kernel-space further comprises a sleep queue hash table (SQHT) 124 for storing a reference to a sleep object comprising a process referenced on the sleep queue of the sleep object. For example, given process Y 104 is sleeping and a reference to process Y is stored on sleep queue 114 of sleep object A 110, a reference to sleep object A is stored in SQHT 124. In at least some embodiments, SQHT 124 stores sleep objects based on a value generated by a hash of a resource ID and a space ID. Wakeup process 120 and sleep process 122, when executed by the processor, may cause the processor to identify and access a sleep object stored on SQHT 124.

Figure 2:
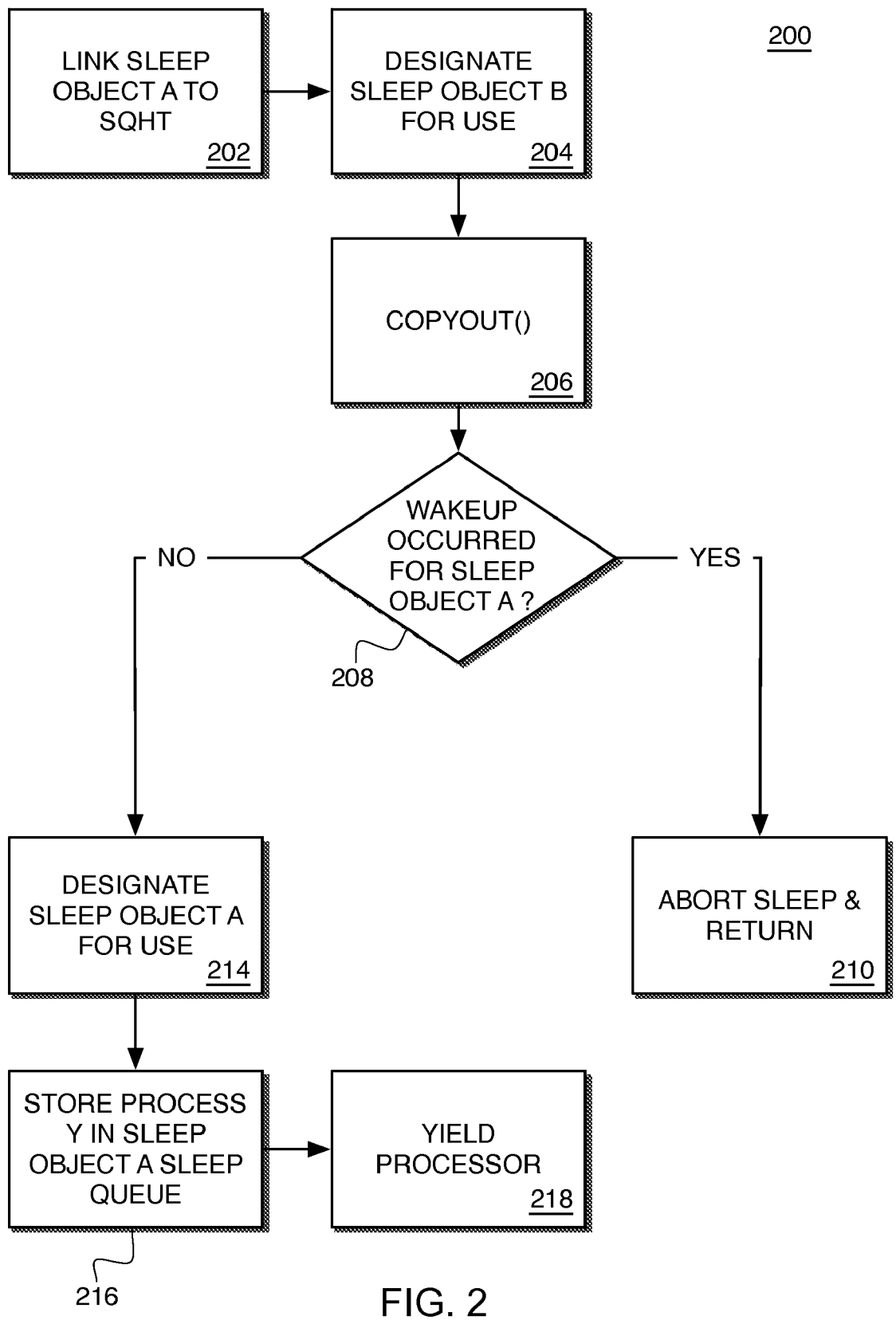
FIG. 2 is a high-level process flow diagram of a sleep method according to an embodiment.

FIG. 2 depicts a high-level process flow diagram of a sleep method 200 according to an embodiment, e.g., as implemented by sleep process 122 executed by a processor, wherein process Y 104 is associated with sleep objects A and B 110, 112. Sleep method 200 receives resource ID 105 based on the resource, i.e., resource 102, to which process Y 104 is attempting to obtain a lock. The process flow begins at link sleep object A functionality 202 wherein the processor stores a reference to sleep object A 110 in SQHT 124. In at least some embodiments, processor stores the reference to sleep object 110 based on a hash of space ID 108 and resource ID 105.

The process flow then proceeds to designate sleep object B functionality 204 wherein the processor designates sleep object B 112 for use in causing process Y 104 to sleep.

The process flow proceeds to copyout functionality 206 wherein sleep process 122 causes execution of a copyout process with respect to process Y 104. Copyout functionality 206 releases any user-space locks held by process Y 104, e.g., held with respect to another resource, in order that the process not retain the lock while sleeping to the exclusion of other processes. In a particular embodiment, the copyout( ) system call may be used to copy data from kernel space to user space and may sleep if the copied data is not in memory. Sleep method 200 may sleep during execution of copyout functionality 206. Based on execution of designate sleep object B functionality 204, if the executing copyout process is caused to sleep during copyout functionality 206, the processor causes process Y 104 to be placed on sleep queue 116 of sleep object B 112.

Upon completion of copyout functionality 206, the process flow proceeds to wakeup check functionality 208 wherein the processor determines whether wakeup process 120 has executed with respect to sleep object A 110 during execution of copyout functionality 206. In at least some embodiments, the processor performs the wakeup check functionality 208 based on a field in sleep object A 110 which indicates whether the sleep object has received a wakeup signal.

If the result of wakeup check functionality 208 is positive ("Yes"), the flow proceeds to abort sleep functionality 210 wherein the processor terminates execution of sleep process 122 (sleep method 200) and returns thereby enabling process Y 104 to continue executing.

Returning to wakeup check functionality 208, if the result of the wakeup check functionality is negative ("NO"), the flow proceeds to designate sleep object A functionality 214 wherein the processor designates sleep object A 110 for use in further operations performed with respect to process Y 104. After designating sleep object A 110, the process flow proceeds to functionality 216 wherein the processor stores a reference to process Y 104 in sleep queue 114 of sleep object A 110.

After completing functionality 216, the process flow proceeds to yield processor functionality 218 wherein sleep process 122 completes execution and yields control of the processor to other processes for execution.

Figure 3:
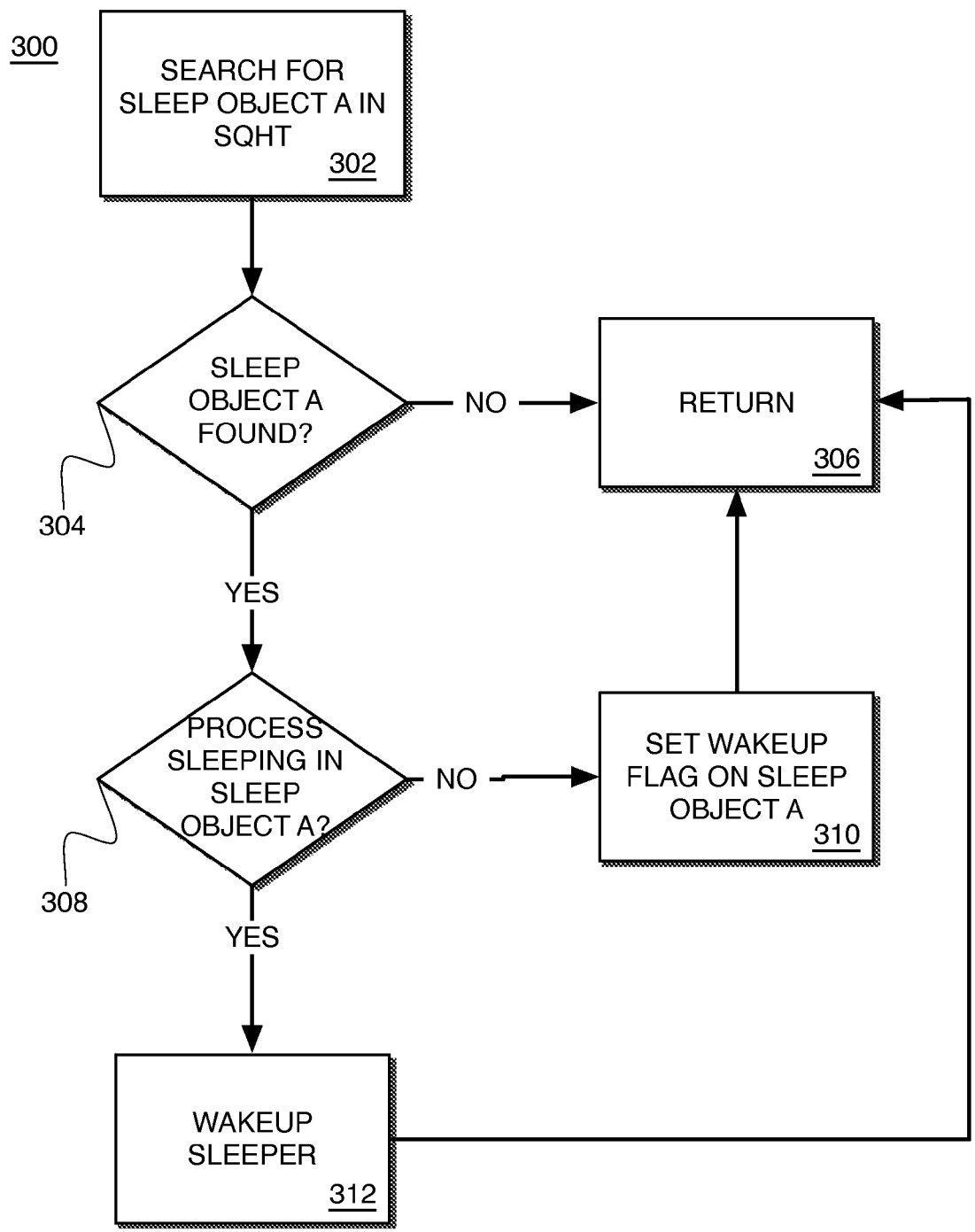
FIG. 3 is a high-level process flow diagram of a wakeup method according to an embodiment.

FIG. 3 depicts a high-level process flow diagram of a wakeup method 300 according to an embodiment, e.g., as implemented by wakeup process 120 executed by a processor, wherein process Y 104 is associated with sleep queue 114 of sleep object A 110 stored on SQHT 124. At the beginning of wakeup method 300, wakeup process 120 is passed resource ID 105 designating a particular resource which has been released for use by spinning processes, e.g., as a result of process X 100 releasing resource 102 for use by sleeping process Y 104. The flow begins at search for sleep object functionality 302 wherein the processor executing wakeup process 120 instructions searches SQHT 124 for sleep object A 110. Based on resource ID 105, execution of wakeup process 120 by the processor is able to determine a corresponding space ID 108 of a process, e.g., process Y 104, which is waiting for the resource related to the resource ID. Based on resource ID 105 and the determined space ID 108, wakeup process executed by the processor determines the corresponding sleep object in SQHT 124.

The flow of control proceeds to sleep object determination 304. If the result of search for sleep object functionality 302 is negative ("NO"), i.e., wakeup method 300 fails to locate a sleep object in SQHT 124, the flow proceeds to return functionality 306 and the flow of control returns from wakeup method 300.

If the result of search for sleep object functionality 302 is positive ("YES"), i.e., wakeup method 300 locates a corresponding sleep object in SQHT 124, the flow proceeds to sleeper determination functionality 308 wherein wakeup process 120 determines whether sleep queue 114 of sleep object A 110 comprises a sleeping process, e.g., process Y 104. In at least some embodiments, sleep object A 110 comprises a value indicating whether there are any processes in sleep queue 114. In at least some embodiments, sleep object A 110 comprises a counter recording the number of processes in sleep queue 114.

If the result of sleeper determination functionality 308 is negative ("NO"), the flow proceeds to set wakeup flag 310 wherein wakeup process 120 execution by the processor causes the processor to set a wakeup field of sleep object A 110 to a value indicating that a wakeup has occurred for the sleep object. The flow proceeds to return functionality 306 wherein the wakeup process 120 completes.

If the result of sleeper determination 304 is positive ("YES"), the flow proceeds to wakeup sleeper functionality 312 wherein the processor performs wakeup operations causing the identified sleeping process, i.e., the process found in sleep queue 114 of sleep object A 110, to resume execution. The flow of control then proceeds to return functionality 306.

In at least some embodiments, a set of instructions comprising wakeup method 300 and sleep method 200 may be stored in a memory. The set of instructions may be read by a processor in order to cause the processor to perform the methods according to the above-described embodiments.

In at least some embodiments, a particular process associated with sleep object A 100 and sleep object B 112 is able to receive a wakeup signal at one and/or both of the sleep objects A and B. In at least some embodiments, the particular process associated with sleep object A 100 and sleep object B 112 is able to receive a wakeup signal at sleep object A 100 during a period in which sleep object B 112 is sleeping, i.e., the particular process is sleeping on the sleep queue of sleep object B.

What is claimed is:

1. A system for asynchronous process sleep or wake management, comprising:
   a processor; and
   a memory storing instructions which, when executed by the processor, cause the processor to implement:
   a sleep queue hash table;
   a process;
   a first sleep object comprising a first sleep queue, wherein the first sleep object is associated with the process;
   a second sleep object comprising a second sleep queue, wherein the second sleep object is associated with the process;
   one or more kernel-space processes arranged to perform at least one of associating the first sleep object with the sleep queue hash table and designating the second sleep object for use in sleeping the process; and
   a sleep process arranged to place a reference to the process on the second sleep queue if execution of a copyout functionality with respect to the process is caused to sleep.

2. The system of claim 1, wherein the sleep queue hash table is managed by an operating system.

3. The system of claim 1, wherein the one or more kernel-space processes comprises at least one of a wakeup process and the sleep process.

4. The system of claim 3, wherein the wakeup process is arranged to search the sleep queue hash table for the first sleep object based on an identifier of the process and a resource identifier.

5. The system of claim 3, wherein the wakeup process is arranged to set a wakeup flag on the first sleep object if the first sleep queue is empty and the first sleep object is associated with the sleep queue hash table.

6. The system of claim 5, wherein the first sleep object is associated with the sleep queue hash table based on an identifier of the process and a resource identifier.

7. The system of claim 3, wherein the wakeup process is arranged to wakeup the process if the first sleep queue comprises the process and the first sleep object is associated with the sleep queue hash table.

8. The system of claim 3, wherein the sleep process is arranged to associate the first sleep object with the sleep queue hash table, designate the second sleep object for use in sleeping the process, and cause execution of the copyout functionality.

9. The system of claim 8, wherein the sleep process is further arranged to determine whether the first sleep object indicates reception of a wakeup signal after execution of the copyout functionality.

10. The system of claim 9, wherein the sleep process is further arranged to return without sleeping the process if the first sleep object indicates reception of a wakeup signal.

11. The system of claim 9, wherein the sleep process is further arranged to designate the first sleep object for use in sleeping the process, store a reference to the process in the first sleep object, and return.

12. A method of asynchronous process sleep management comprising:
   associating a first sleep object with a sleep queue hash table, wherein a process is associated with the first sleep object;
   designating a second sleep object for use in sleeping the process, wherein the process is associated with the second sleep object;
   receiving a wakeup signal at the first sleep object for the process; and
   placing a reference to the process on a sleep queue of the second sleep object if execution of a copyout functionality with respect to the process is caused to sleep.

13. The method of claim 12, wherein the receiving is performed during a period in which the reference to the process is stored in the sleep queue of the second sleep object.

14. The method of claim 12, wherein the receiving comprises receiving the wakeup signal for the process at each of the first sleep object and the second sleep object.

15. The method of claim 12, wherein the receiving comprises receiving the wakeup signal during sleeping of the process.

16. The method of claim 12, further comprising:
   executing the copyout functionality with respect to the process.

17. The method of claim 12, wherein the associating the first sleep object comprises performing a hash of a resource identifier and an identifier of the process associated with the first sleep object.

18. The method of claim 12, further comprising aborting sleeping the process, after executing the copyout functionality, if the first sleep object indicates reception of a wakeup signal.

19. The method of claim 12, further comprising:
   designating the first sleep object for use in sleeping the process; and
   sleeping the process if the first sleep object indicates no reception of a wakeup signal.

20. The method of claim 19, wherein the sleeping the process comprises storing a reference to the process in a first sleep queue of the first sleep object.

21. A memory storing instructions which, when executed by a processor, cause the processor to:
   associate a first sleep object with a sleep queue hash table, wherein a process is associated with the first sleep object;
   designate a second sleep object for use in sleeping the process, wherein the process is associated with the second sleep object;
   execute a copyout functionality with respect to the process; and
   place a reference to the process on a sleep queue of the second sleep object if execution of the copyout functionality with respect to the process is caused to sleep.

22. A method of asynchronous process wake management comprising:
   searching, after completion of a copyout functionality in sleeping a process, a sleep queue hash table for a first sleep object, wherein the process is associated with the first sleep object; and
   setting a wakeup flag on the first sleep object if a first sleep queue of the first sleep object is empty and the first sleep object is associated with the sleep queue hash table; or waking the process if the first sleep queue comprises the process and the first sleep object is associated with the sleep queue hash table,
   wherein a reference to the process is placed on a sleep queue of a second sleep object if execution of the copyout functionality with respect to the process is caused to sleep.

23. The method of claim 22, wherein the searching comprises searching based on an identifier of the process and a resource identifier.

24. A memory storing instructions which, when executed by a processor, cause the processor to:
   search a sleep queue hash table for a first sleep object, wherein a process is associated with the first sleep object;
   set a wakeup flag on the first sleep object if a sleep queue of the first sleep object is empty and the first sleep object is associated with the sleep queue hash table, or wake the process if the first sleep object sleep queue comprises the process and the first sleep object is associated with the sleep queue hash table; and
   place a reference to the process on a sleep queue of a second sleep object if execution of a copyout functionality during a sleep process with respect to the process is caused to sleep.

* * * * *